United States Patent [19]

Darling

[11] Patent Number: 5,752,587
[45] Date of Patent: May 19, 1998

[54] AUXILIARY BRAKING SYSTEM

[76] Inventor: Fred Darling, 3862 Riviera Dr. #102, San Diego, Calif. 92109

[21] Appl. No.: 732,698

[22] Filed: Oct. 18, 1996

[51] Int. Cl.[6] ............................................. B60T 1/14
[52] U.S. Cl. .................. 188/5; 188/16; 180/9.46; 280/766.1; 280/767
[58] Field of Search ..................... 303/9, 9.61, 10; 188/80, 5, 16, 106 P, 8, 1.12, 4 R, 19; 180/9.46, 200, 202, 199; 280/767, 766.1

[56] References Cited

U.S. PATENT DOCUMENTS

| | | | |
|---|---|---|---|
| 2,841,249 | 7/1958 | Allen | 188/5 |
| 2,871,986 | 2/1959 | Polovitch | 188/5 |
| 3,042,150 | 7/1962 | Lukawsky | 188/4 R |
| 3,062,327 | 11/1962 | Debus | 188/5 |
| 3,703,223 | 11/1972 | McInnes | 188/5 |
| 3,994,369 | 11/1976 | Powaska | 188/5 |
| 4,605,086 | 8/1986 | Marom | 280/767 X |
| 4,699,252 | 10/1987 | Sing | 188/5 |

*Primary Examiner*—Robert J. Oberleitner
*Assistant Examiner*—Pamela Lipka

[57] ABSTRACT

An auxiliary braking system including a brake. A hydraulic arm is secured to a frame of the automobile. The hydraulic arm has a free end secured to the brake. The hydraulic arm has an up line and a down line extending outwardly therefrom. A pump is secured within the frame of the automobile. The pump is coupled with free ends of the up line and the down line of the hydraulic arm. The pump has wiring extending outwardly therefrom to couple with existing brake lines of the automobile.

2 Claims, 3 Drawing Sheets

AUXILIARY BRAKING SYSTEM

BACKGROUND OF THE INVENTION

1. Field of the Invention

The present invention relates to an auxiliary braking system and more particularly pertains to providing additional friction when braking an automobile with an auxiliary braking system.

2. Description of the Prior Art

The use of braking devices is known in the prior art. More specifically, braking devices heretofore devised and utilized for the purpose of preventing movement of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,427,086 to de Coislet (de F.) discloses a vehicle fitted with an auxiliary wheel for propelling, guiding and or braking the vehicle.

U.S. Pat. No. 4,211,299 to Schulte discloses a parking apparatus for laterally shifting a vehicle.

U.S. Pat. No. 4,605,086 to Marom discloses a lifting and maneuvering device for motor vehicles.

U.S. Pat. No. 5,408,723 to Julien et al. discloses a swivel wheel assembly.

U.S. Pat. No. 5,328,257 to Tsukamoto discloses a hydraulic brake actuator.

U.S. Pat. No. 4,925,252 to Hee discloses an automobile brake system.

While these devices fulfill their respective, particular objective and requirements, the aforementioned patents do not describe an auxiliary braking system for providing additional friction when braking an automobile.

In this respect, the auxiliary braking system according to the present invention substantially departs from the conventional concepts and designs of the prior art, and in doing so provides an apparatus primarily developed for the purpose of providing additional friction when braking an automobile.

Therefore, it can be appreciated that there exists a continuing need for new and improved auxiliary braking system which can be used for providing additional friction when braking an automobile. In this regard, the present invention substantially fulfills this need.

SUMMARY OF THE INVENTION

In the view of the foregoing disadvantages inherent in the known types of braking devices now present in the prior art, the present invention provides an improved auxiliary braking system. As such, the general purpose of the present invention, which will be described subsequently in greater detail, is to provide a new and improved auxiliary braking system and method which has all the advantages of the prior art and none of the disadvantages.

To attain this, the present invention essentially comprises a brake comprising a central spring bar having a pair of wheels rotatably disposed on opposing ends thereof. The pair of wheels include front wheels and rear wheels. The pair of wheels have automatic brakes disposed therein. The central spring bar has an elongated steering shaft pivotally secured thereto and extending upwardly and rearwardly therefrom. A free end of the steering shaft couples with a steering rod of an automobile. A pair of belts extend around opposing front and rear wheels. The brake is positioned between front wheels of the automobile. A hydraulic arm is secured to a frame of the automobile. The hydraulic arm has a free end secured to the central spring bar of the brake. The hydraulic arm has an up line and a down line extending outwardly therefrom. A pump is secured within the frame of the automobile. The pump is coupled with free ends of the up line and the down line of the hydraulic arm. The pump has wiring extending outwardly therefrom to couple with existing brake lines of the automobile.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved auxiliary braking system which has all the advantages of the prior art braking devices and none of the disadvantages.

It is another object of the present invention to provide a new and improved auxiliary braking system which may be easily and efficiently manufactured and marketed.

It is a further object of the present invention to provide a new and improved auxiliary braking system which is of durable and reliable construction.

An even further object of the present invention is to provide a new and improved auxiliary braking system which is susceptible of a low cost of manufacture with regard to both materials and labor, and which accordingly is then susceptible of low prices of sale to the consuming public, thereby making such an auxiliary braking system economically available to the buying public.

Even still another object of the present invention is to provide a new and improved auxiliary braking system for providing additional friction when braking an automobile.

Lastly, it is an object of the present invention to provide a new and improved auxiliary braking system including a brake. A hydraulic arm is secured to a frame of the automobile. The hydraulic arm has a free end secured to the brake. The hydraulic arm has an up line and a down line extending outwardly therefrom. A pump is secured within the frame of the automobile. The pump is coupled with free ends of the up line and the down line of the hydraulic arm. The pump has wiring extending outwardly therefrom to couple with existing brake lines of the automobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
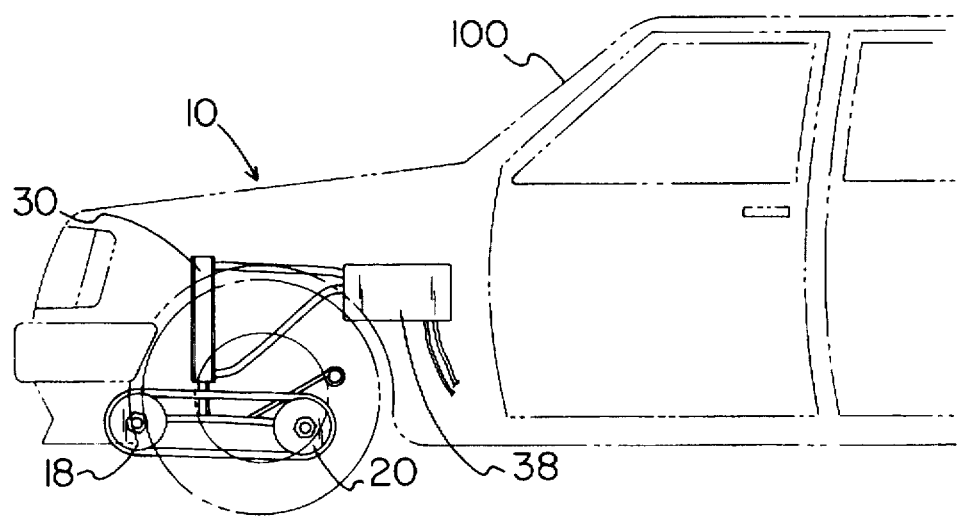
FIG. 1 is a side view of the preferred embodiment in place on an automobile.
Figure 2:
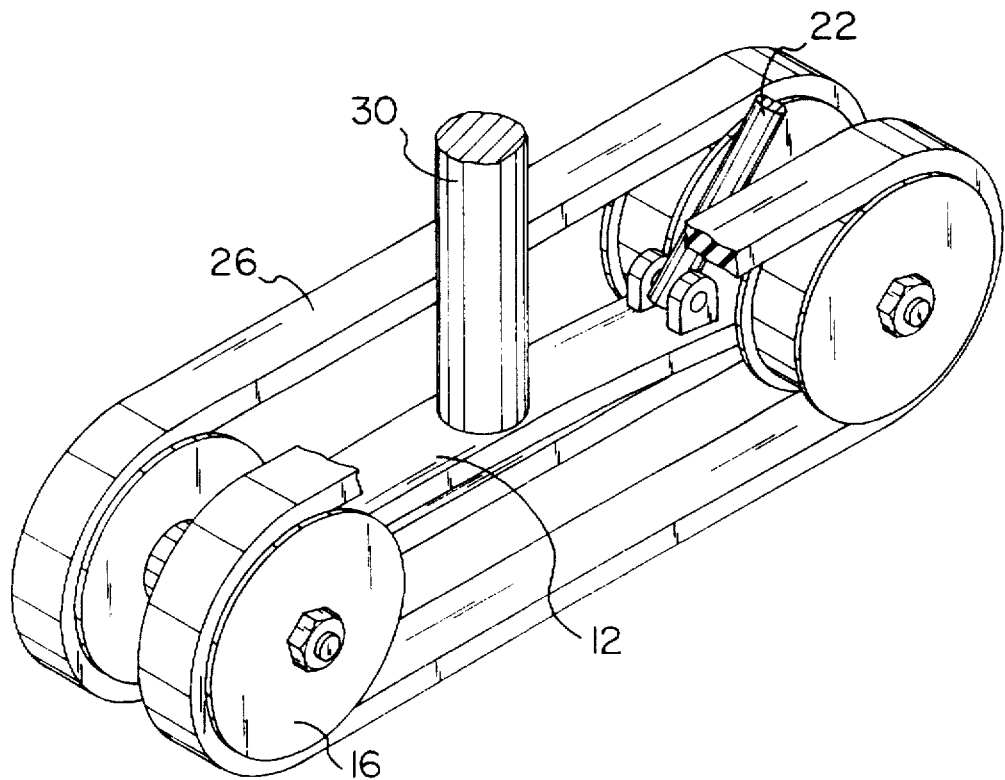
FIG. 2 is a perspective view of the preferred embodiment of the auxiliary braking system constructed in accordance with the principles of the present invention.
Figure 3:
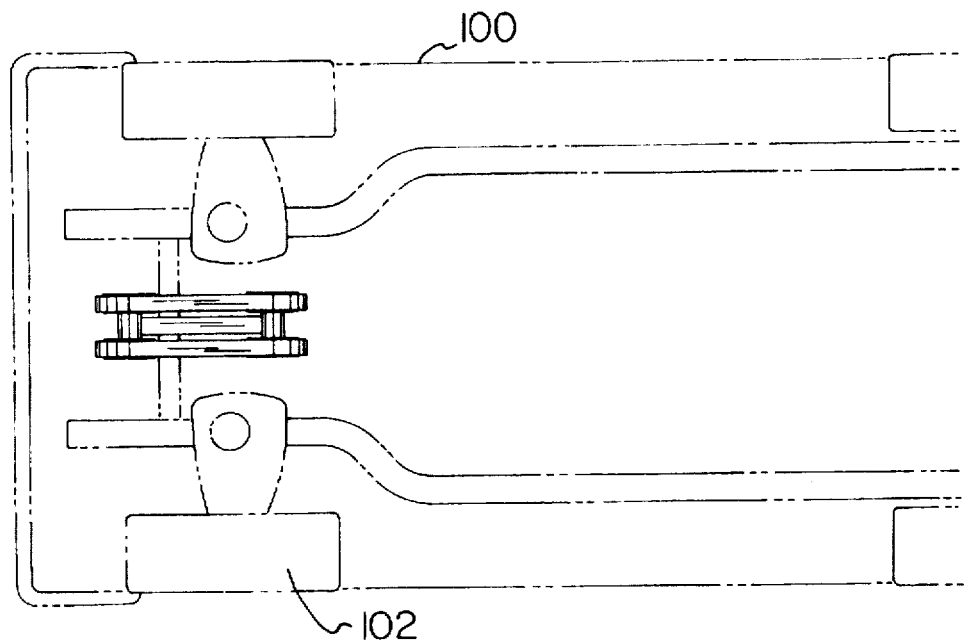
FIG. 3 is a bottom view of the preferred embodiment in place on the automobile.
Figure 4:
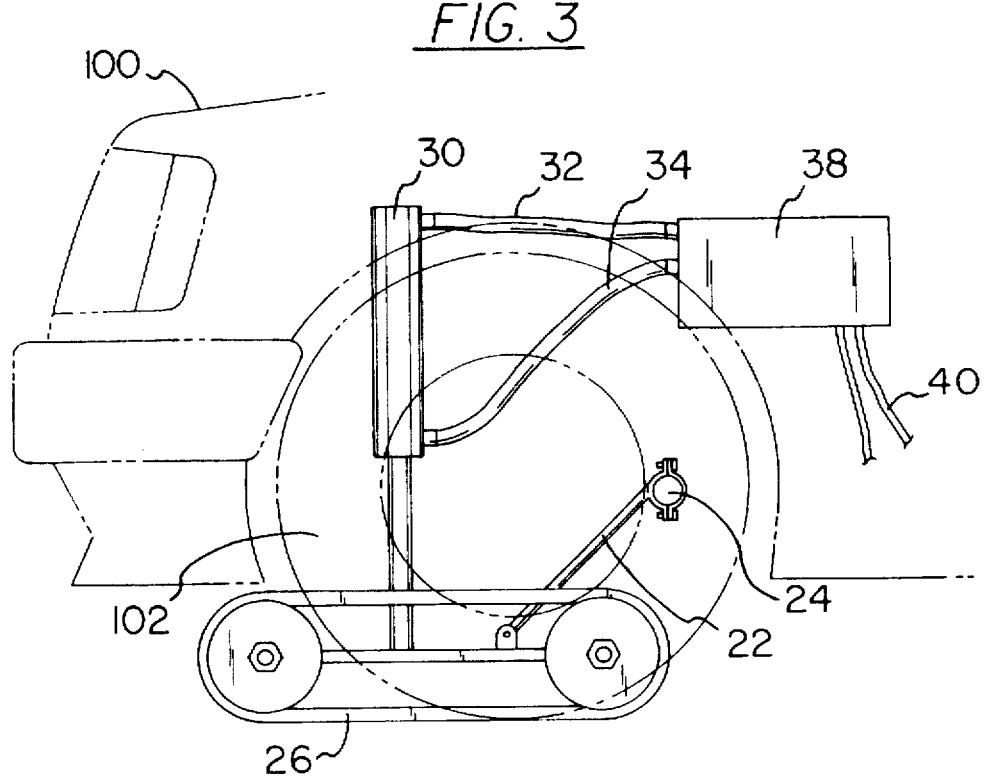
FIG. 4 is a side view of the preferred embodiment in an engaged position.

With reference now to the drawings, and in particular, to FIGS. 1–6 thereof, the preferred embodiment of the new and improved auxiliary braking system embodying the principles and concepts of the present invention and generally designated by the reference number 10 will be described.

Specifically, it will be noted in the various Figures that the device relates to an auxiliary braking system for providing additional friction when braking an automobile. In its broadest context the device consists of a brake, a hydraulic arm and a pump. Such components are individually configured and correlated with respect to each other so as to attain the desired objective.

The system 10 includes a brake 12 comprising a central spring bar 14 having a pair of wheels 16 rotatably disposed on opposing ends thereof. The pair of wheels 16 include front wheels 18 and rear wheels 20. The pair of wheels 16 have automatic brakes (not shown) disposed therein. The central spring bar 14 has an elongated steering shaft 22 pivotally secured thereto and extending upwardly and rearwardly therefrom. A free end of the steering shaft 22 couples with a steering rod 24 of an automobile 100. A pair of belts 26 extend around opposing front 18 and rear wheels 20. The brake 12 is positioned between front wheels 102 of the automobile. The front wheels 18 are positioned ahead of the front wheels 102 of the automobile 100 and the rear wheels 20 are positioned along a same plane as the front wheels 102 of the automobile 100. The brake 12 is positioned whereby the rear wheels 20 are slightly lower than the front wheels 18 so that the rear wheels 20 will contact a recipient surface before the front wheels 18. The central spring bar 14 can be biased inwardly to allow for the removal and replacement of the bolts 26.

A hydraulic arm 30 is secured to a frame of the automobile 100. The hydraulic arm 30 has a free end secured to the central spring bar 14 of the brake 12. The hydraulic arm 30 has an up line 32 and a down line 34 extending outwardly therefrom. The hydraulic arm 30 serves to selectively raise or lower the brake 12.

A pump 38 is secured within the frame of the automobile 100. The pump 30 is coupled with free ends of the up line 32 and the down line 34 of the hydraulic arm 30. The pump 38 has wiring 40 extending outwardly therefrom to couple with existing brake lines of the automobile 100. When a driver presses on the existing brake pedal, the pump 38 will activate the hydraulic pump 30 to lower the brake 12 onto the road or other recipient surface.

Figure 5:
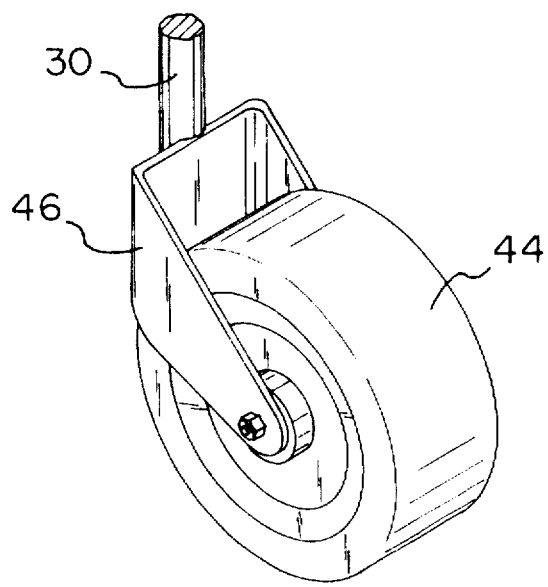
FIG. 5 is a perspective view of a second embodiment of the present invention.

A second embodiment of the present invention is shown in FIG. 5 and includes substantially all of the components of the present invention further including the brake comprising a singular wheel 44 having an internal brake (not shown). The singular wheel 44 has a bracket 46 coupled thereto. The bracket 46 is secured to the free end of the hydraulic arm 30.

Figure 6:
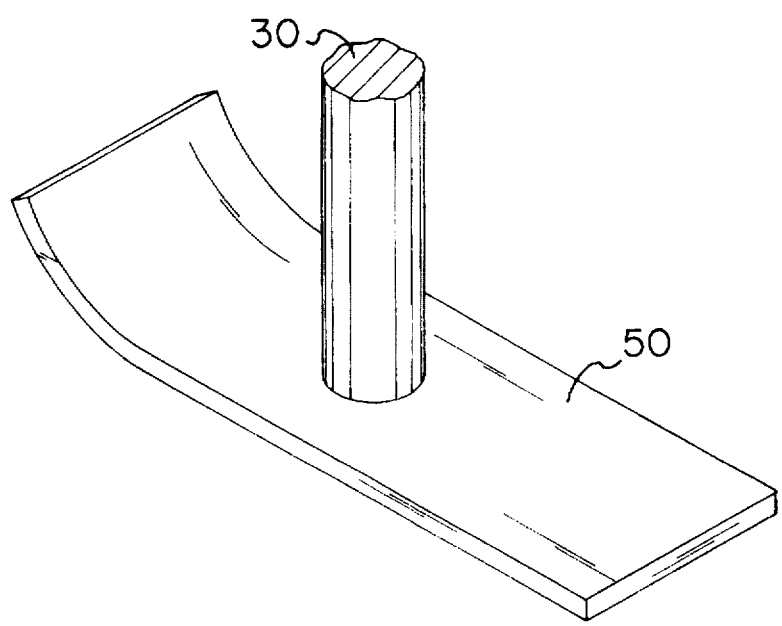
FIG. 6 is a perspective view of a third embodiment of the present invention.

A third embodiment of the present invention is shown in FIG. 6 and includes substantially all of the components of the present invention further including the brake comprising a sled 50 secured to the free end of the hydraulic arm 30.

The present invention could also be incorporated into other types of automated vehicles. Such vehicles would include, but are lot limited to, RV's, trailers and trucks. Additionally, the system 10 can be incorporated into semi-trailer; where its inclusion would help prevent jack knifing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An auxiliary braking system for providing additional friction when braking an automobile comprising, in combination:

a brake comprising a central spring bar having a pair of wheels rotatably disposed on opposing ends thereof, the pair of wheels including front wheels and rear wheels, the pair of wheels having automatic brakes disposed therein, the central spring bar having an elongated steering shaft pivotally secured thereto and extending upwardly and rearwardly therefrom, a free end of the steering shaft coupling with a steering rod of an automobile, a pair of belts extending around opposing front and rear wheels, the brake being positioned between front wheels of the automobile;

a hydraulic arm secured to a frame of the automobile, the hydraulic arm having a free end secured to the central spring bar of the brake, the hydraulic arm having an up line and a down line extending outwardly therefrom;

a pump secured within the frame of the automobile, the pump being coupled with free ends of the up line and the down line of the hydraulic arm, the pump having wiring extending outwardly therefrom to couple with existing brake lines of the automobile.

2. An auxiliary braking system comprising:

a brake, the brake comprising a pair of belts extending around opposing front and rear wheels, the brake being positioned between front wheels of an automobile;

a hydraulic arm secured to a frame of the automobile, the hydraulic arm having a free end secured to the brake, the hydraulic arm having an up line and a down line extending outwardly therefrom;

a pump secured within the frame of the automobile, the pump being coupled with free ends of the up line and the down line of the hydraulic arm, the pump having wiring extending outwardly therefrom to couple with existing brake lines of the automobile.

* * * * *